(12) United States Patent
Herzog (10) Patent No.: US 11,035,109 B2
(45) Date of Patent: Jun. 15, 2021

(54) ROD-MOUNTABLE HOLDER

(71) Applicant: Hansgrohe SE, Schiltach (DE)

(72) Inventor: Uwe Herzog, Rheinau/Diersheim (DE)

(73) Assignee: Hansgrohe SE, Schiltach (DE)

( * ) Notice: Subject to any disclaimer, the term of this patent is extended or adjusted under 35 U.S.C. 154(b) by 127 days.

(21) Appl. No.: 16/446,607

(22) Filed: Jun. 19, 2019

(65) Prior Publication Data

US 2019/0390447 A1    Dec. 26, 2019

(30) Foreign Application Priority Data

Jun. 20, 2018  (DE) .................. 10 2018 209 985.5

(51) Int. Cl.
 *E03C 1/06*  (2006.01)
 *E03C 1/10*  (2006.01)
 (Continued)

(52) U.S. Cl.
 CPC .............. *E03C 1/106* (2013.01); *E03C 1/066* (2013.01); *F16B 2/22* (2013.01); *F16L 3/003* (2013.01); *F16M 13/022* (2013.01)

(58) Field of Classification Search
 CPC .... E03C 1/066; E03C 1/06; F16B 2/06; F16B 2/245; F16B 2/248; F16L 3/003
 (Continued)

(56) References Cited

U.S. PATENT DOCUMENTS 5,277,391 A * 1/1994 Haug ...................... E03C 1/066
                                                 248/218.4
5,481,765 A * 1/1996 Wang ...................... A47K 3/28
                                                    4/567
(Continued)

FOREIGN PATENT DOCUMENTS

CN    101201075 A    6/2008
CN    203701212 U    7/2014
(Continued)

OTHER PUBLICATIONS

European Search Report issued by the German Patent Office, dated Jan. 16, 2020, for German Patent Application No. 19179448.6; 9 pages.

(Continued)

*Primary Examiner* — Bradley Duckworth
(74) *Attorney, Agent, or Firm* — Bose McKinney & Evans LLP (57) ABSTRACT

A holder including a holding body configured for displaceable attachment to a rod and including a rod passage opening for the rod, and a clamping unit movable between a clamp position and an enable position. The clamping unit, in case of the holding body attached to the rod, in the enable position is capable of enabling a shifting movement of the holding body along the rod and in the clamp position is capable of exerting a clamping force to block a shifting movement of the holding body along the rod. An operating unit is provided for user-operated moving of the clamping unit between the clamp position and the enable position. The clamping unit is a wrap spring unit wrapping around the rod passage opening and comprising a plurality of wrap springs disposed adjacent to each other in a longitudinal axis direction of the rod passage opening, each spring wrapping around the rod passage opening over more than 180°, and/or a wrap spring wrapping around the rod passage opening over more than 360°, wherein the respective wrap spring is movable by the operating unit between a constricting condition providing the clamp position of the clamping unit and an enlarging condition providing the enable position of the clamping unit.

20 Claims, 4 Drawing Sheets

(51) Int. Cl.
*F16B 2/22* (2006.01)
*F16L 3/00* (2006.01)
*F16M 13/02* (2006.01)

(58) Field of Classification Search
USPC .............................................. 4/570; 248/75
See application file for complete search history.

(56) References Cited

U.S. PATENT DOCUMENTS

| | | | |
|---|---|---|---|
| 6,024,331 A | 2/2000 | Bischoff et al. | |
| 7,721,363 B2 * | 5/2010 | Huang | E03C 1/06 4/605 |
| 8,448,270 B2 | 5/2013 | Yang | |
| 9,200,651 B2 | 12/2015 | Lin | |
| 10,267,023 B2 | 4/2019 | Kalmbach et al. | |
| 2007/0245483 A1 | 10/2007 | Eilmus et al. | |
| 2015/0233101 A1 | 8/2015 | Andersen | |
| 2019/0239700 A1 | 8/2019 | Wang et al. | |

FOREIGN PATENT DOCUMENTS

| | | |
|---|---|---|
| CN | 107165231 A | 9/2017 |
| CN | 206545241 U | 10/2017 |
| CN | 108166577 A | 6/2018 |
| DE | 2342613 B2 | 2/1975 |
| DE | 19705285 A1 | 8/1998 |
| DE | 202004006168 U1 | 6/2004 |
| DE | 10303169 A1 | 7/2004 |
| DE | 102010063968 A1 | 6/2012 |
| DE | 102015226624 A1 | 6/2017 |
| EP | 0733747 B1 | 1/2002 |
| EP | 0965699 B1 | 9/2004 |
| EP | 1921214 A1 | 5/2008 |
| EP | 2703569 B1 | 5/2016 |
| FR | 1229937 A | 9/1960 |
| JP | H10-8514 A | 1/1998 |
| JP | 2008184765 A | 8/2008 |
| JP | 4879034 B2 | 2/2012 |
| RU | 2008145587 A | 5/2010 |
| WO | 2011088783 A1 | 7/2011 |

OTHER PUBLICATIONS

First Office Action (in Chinese Language) issued by the National Intellectual Property Administration, P.R. China, dated Jun. 16, 2020, for Chinese Patent Application No. 201910536377.1; 7 pages.
Decision on Granting a Patent for Invention issued by the Federal Service for Intellectual Property, Patents and Trademarks (ROSPATENT), dated Oct. 29, 2019, for Russian Application No. 2019118513/12(035540).
European Search Report issued by the European Patent Office, dated Jan. 16, 2020, for European Patent Application No. 19179448.6; 9 pages.
Office Action issued by the National Intellectual Property Administration, P.R. China, dated Nov. 26, 2020 for Chinese Patent Application No. 201910536377.1 (English language translation included), 14 pages.

* cited by examiner

ROD-MOUNTABLE HOLDER

CROSS-REFERENCE TO RELATED APPLICATION

This application claims priority to German Patent Application No. DE 10 2018 209 985.5, filed on Jun. 20, 2018, the disclosure of which is expressly incorporated herein by reference.

BACKGROUND AND SUMMARY OF THE DISCLOSURE

The invention relates to a rod-mountable holder having a holding body, which is configured for attachment to a rod, wherein the holder can be, in particular, a holder for a sanitary hand-held shower. In the latter case, the holding body can be mounted displaceably or non-displaceably on a hand-held shower rod.

Various conventional rod-mountable holders of this kind, i.e. holders that are intended and designed to be mounted on a rod, especially in the form of hand-held shower holders, are disclosed in patents EP 0 965 699 B1, DE 23 42 613 B2, EP 2 703 569 B1, EP 0 733 747 B1, JP 4-879034 B2 and U.S. Pat. No. 8,448,270 B2 as well as patent applications DE 103 03 169 A1, EP 1 921 214 A1, WO 2011/088783 A1 and DE 10 2010 063 968 A1, for example.

In a widely available type of such holders, the holding body is configured for displaceable attachment to a rod and has a rod passage opening for the rod, wherein the holder furthermore includes a clamping unit movable between a clamp position and an enable position, which clamping unit, in case of the holding body attached to the rod, in the enable position enables a shifting movement of the holding body along the rod and in the clamp position exerts a clamping force, which blocks a shifting movement of the holding body along the rod, and an operating unit for user-operated moving of the clamping unit between the clamp position and the enable position thereof. By appropriate actuation of the operating unit, it is thus possible for a user to release the holder, which, when used as a hand-held shower holder, for example, has suitable means for the preferably removable holding of a hand-held shower, from its clamp position on the rod when required, to shift it along the rod and to bring it back into its clamp position on the rod at the new rod position.

German Laid-Open Application DE 10 2015 226 624 A1 discloses a hand-held shower holder of this kind in which the clamping unit is formed by two clamping jaws, which can be spread apart elastically from a clamp position that reduces a clamping gap into a shifted position that enlarges a clamping gap, which at least partially surround the holding rod and between them define a clamping gap. A wedge element of the operating unit can extend displaceably into the clamping gap. The clamping jaws can be preloaded into the clamp position by means of an elastic element or, alternatively, can be embodied with inherent elasticity or spring properties.

Hand-held shower holders of the type stated at the outset which can be mounted in various ways on a hand-held shower rod are also already in use, the holding body of which holders includes a rod holding part that can be mounted displaceably or non-displaceably on the hand-held shower rod, a shower holding part for holding the hand-held shower and a rotatable coupling, by means of which the shower holding part is coupled rotatably to the rod holding part in a manner which allows rotation relative to the latter at least in a first rotational direction and optionally, in addition, in a second rotational direction opposite to the first. The rod holding part can, for example, have a rod passage opening, through which the rod extends in the mounted state of the holder. The shower holding part can, for example, have a socket for the removable reception of the hand-held shower, more specifically of a hand-held shower body thereof or of a hand-held shower hose connected to said body. In this case, the shower holding part can be rotated by the user when required in order to change the orientation of the hand-held shower arranged thereon in a corresponding manner.

It is an object of the invention to provide a rod-mountable holder of the type stated at the outset which offers advantages in respect of functionality, operating convenience and/or production outlay over the conventional holders.

The invention achieves this and other objects by providing a novel, inventive rod-mountable holder having specific features.

According to one aspect of the invention, the illustrative rod-mountable holder includes a holding body configured for displaceable attachment to a rod and having a rod passage for the rod, a clamping unit movable between a clamp position and an enable position, which clamping unit is formed by a wrap spring unit wrapping around the rod passage opening and, in case of the holding body attached to the rod, in the enable position enables a shifting movement of the holding body along the rod and in the clamp position exerts a clamping force, which blocks a shifting movement of the holding body along the rod, and an operating unit for user-operated moving of the clamping unit or wrap spring unit between the clamp position and the enable position thereof. The wrap spring unit includes a plurality of wrap springs disposed adjacent to each other in a longitudinal axis direction of the rod passage opening, each spring wrapping around the rod passage opening over more than 180°, and/or a wrap spring wrapping around the rod passage opening over more than 360°. At its two ends, the respective wrap spring is movable by the operating unit between a constricting condition providing the clamp position of the clamping unit and an enlarging condition providing the enable position of the clamping unit, for which purpose the operating unit preferably interacts with one or both ends of the wrap spring.

The holder equipped with this clamping unit requires only relatively little outlay on production and has very favourable functional properties in respect of releasable clamping fixing on a rod. It is suitable particularly as a holder for a sanitary hand-held shower or a corresponding hand-held shower body on a hand-held shower rod, e.g. in a shower room, where it can be used in a conventional manner to hold the hand-held shower body in a vertically adjustable manner or, alternatively, for corresponding lateral jet showers, in a manner which allows it to be shifted along a horizontal hand-held shower rod. The special clamping unit in the form of the wrap spring unit allows reliable fixing of the holder on the rod in its clamp position, on the one hand, and allows sufficiently easy shifting of the holder along the rod in its enable position, on the other hand.

The wrap spring unit offers many degrees of freedom in order to adjust the clamping behaviour of this clamping unit in any desired way which is optimum for the respective application, both in the clamp position and in the enable position. This includes, for example, the choice of the wrap angle, i.e. by how many degrees and with how many turns/windings the wrap spring unit wraps around the rod passage opening, the choice of spring material for the one or more wrap springs, the choice of the number of wrap springs disposed adjacent to each other, the choice of the diameter of the turns/windings and the cross-sectional area and cross-sectional shape of a spring material used for the respective wrap spring. When required, the wrap spring unit can be configured in such a way, for example, that it still provides a slight clamping force, which can be overcome easily by the user, in the enable position, thus ensuring that the holder does not accidentally fall down a vertical rod when the user actuates the operating unit to release the clamping. By means of a suitable configuration of this kind of the wrap spring unit, it is furthermore possible to ensure in a simple way that the force to be exerted by the user to shift the holder changes at most only slightly due to different surface conditions of the rod, e.g. dry, damp or oily. By appropriate use of leg spring units with different winding diameters, the holder can furthermore be adapted without major effort to different diameters of the rod to be passed through.

In the illustrative embodiment with a plurality of wrap springs disposed adjacent to each other in the longitudinal axis direction of the rod passage opening, the clamping force in the clamp position and an optionally remaining slight clamping force in the enable position can be set or modified in the desired manner by choosing a corresponding number of wrap springs. The provision of the plurality of wrap springs furthermore increases functional reliability and/or fail safety since, in the case of the breakage of one wrap spring, for example, the intended clamping function can still be adequately performed by the remaining wrap spring or springs.

In the illustrative embodiment with the wrap spring wrapping around the rod passage over more than 360°, the clamping force acting on the rod is correspondingly relatively uniformly distributed over the entire rod circumference, and this can likewise have a positive effect on the clamping behaviour. In corresponding implementations, the wrap spring unit includes a combination of a plurality of wrap springs disposed adjacent to each other in the longitudinal axis direction of the rod passage opening, one or more or even all of which wrap springs wrap around the rod passage opening over more than 360°.

In an illustrative embodiment, the plurality of wrap springs, disposed adjacent to each other in the longitudinal axis direction of the rod passage opening, rest against each other with direct contact, thereby forming a wrap spring pack. This can have functional and design advantages.

In an illustrative embodiment, the wrap spring unit includes a wrap spring wrapping around the rod passage opening over more than 720°, i.e. this wrap spring surrounds the rod passage opening with two or more turns or windings. This too can have functional and design advantages. For example, this wrap spring can then be manufactured from a weaker wire material and still provide a clamping force comparable to a wrap spring made from a stronger wire material which wraps around the rod passage opening only by up to 360° or at least in fewer than two turns. If the wrap spring wraps around the rod passage opening in more windings in the helical spring form conventional for this purpose, this furthermore enlarges the possible contact area between the wrap spring unit and the rod passed through the opening, which can likewise be advantageous for the clamping behaviour of the clamping unit.

In an illustrative embodiment, the two ends of the respective wrap spring are located on a same side in relation to the rod passage opening. This can facilitate or simplify the coupling of the wrap spring unit with the operating unit, especially if the operating unit interacts with the ends of the wrap spring unit.

In an illustrative embodiment, the constricting condition of the respective wrap spring is an initial condition of said spring, to which the wrap spring returns from the enlarging condition automatically by inherent elasticity. This means that the wrap spring unit is prestressed into its clamp position. By means of the operating unit, the user can move the wrap spring unit into the enable position and, after this operating actuation by the user, the wrap spring unit can return automatically to its clamp position.

In an illustrative embodiment, the operating unit is a push button unit including a push button acting on the wrap spring unit. This represents a convenient operating behaviour for the user for corresponding applications. The user can actuate the operating unit reliably, even with just one finger for example, and, when required, can grip the holder with the remaining fingers and shift it on the rod.

In one illustrative embodiment of this operating variant, the push button is arranged to be movable with a radial main directional component in relation to the respective wrap spring and an associated push button toggle lever coupling or a push button slotted guide mechanism ensures that the movement of the push button in this direction is converted into a spreading movement of the ends of the respective wrap spring with a tangential main directional component in relation to the respective wrap spring. Here, the tangential direction denotes the direction tangential to the wrapping/circumferential direction of the wrap spring, and the radial direction denotes the direction perpendicular thereto, transverse to the longitudinal central axis of the wrap spring. In each case, the term "main directional component" should be taken to mean that the actual direction of the relevant push button or wrap spring movement does not have to correspond precisely to this radial or tangential direction but that the directional component of the movement in this direction is greater than in a direction perpendicular thereto. In this embodiment, the relevant wrap spring can consequently be spread apart by the push button actuation, which is, as is conventional, a transverse actuating movement, in order to release or at least reduce its clamping force.

In an alternative embodiment, the operating unit is a rotary knob unit including a rotary knob acting on the wrap spring unit. This embodiment too can be advantageous for corresponding applications and can allow one-handed operation of the holder when required. Even in the case of a relatively long required actuating path to move the wrap spring unit from the clamp position into the enable position, for example, it can be constructed in a relatively compact way since the actuating path in this case is determined by way of the rotation angle of the rotary knob and, in general, the rotation angle does not need to have the effect of increasing the overall size. With a longer actuating path, it is possible when required to reduce the necessary actuating force to overcome the clamping force of the wrap spring unit. Depending on requirements, the rotary knob variant can be embodied in such a way that the rotary knob can be rotated in only one rotational direction or, alternatively, in one and in the other, opposite, rotational direction in order to move the clamping unit into its enable position.

In one illustrative embodiment of this operating variant, the rotary knob is mounted to be movable with a radial main directional component in relation to the respective wrap spring about a rotational axis. An associated rotary knob slotted guide mechanism ensures that the rotational movement of the rotary knob is converted into a spreading movement of the ends of the respective wrap spring with a tangential main directional component in relation to the respective wrap spring. In this case, it is thus possible once again to spread apart the wrap spring by rotating the rotary knob and thereby to move the wrap spring unit from its clamp position into its enable position.

In an illustrative embodiment, the holder includes an open, elastic clamping sleeve which defines the rod passage opening. In this case, the wrap spring unit wraps around the clamping sleeve. Since the clamping sleeve is open and elastic, it can contract and thereby press on the rod passed through when the wrap spring unit moves into its constricting condition. Using the clamping sleeve, it is possible when required to transmit the clamping force of the wrap spring unit very uniformly to the rod by virtue of the increase associated with said sleeve in the contact area with the rod. By means of said sleeve, it is furthermore possible to avoid direct contact of one or more wrap springs with the rod when there is a need therefor, and therefore there is no need to take account of the material or the surface of the rod as regards the selection of the material for the wrap spring unit, for example. Through the use of clamping sleeves with different diameters, simple adaptation to different diameters of the rod to be passed through is possible when required.

According to another illustrative embodiment of the invention, the illustrative rod-mountable holder is configured for use for a sanitary hand-held shower and, for this purpose, has a corresponding holding body for attachment to a hand-held shower rod. The holding body includes a rod holding part mountable to the hand-held shower rod, a shower holding part for holding the hand-held shower and a rotatable coupling, by means of which coupling unit the shower holding part is coupled to the rod holding part to be turnable relative to the latter part at least in a first rotational direction and optionally, in addition, in a second rotational direction, opposite to the first rotational direction. By means of the rod holding part, the hand-held shower, i.e. a corresponding hand-held shower body, can be mounted displaceably or non-displaceably on the hand-held shower rod, depending on requirements. The rotatable coupling includes a wrap spring unit, which wraps around a coupling piece formed on the rod holding part over more than 180° while providing a turning resistance force and is rotationally coupled to the shower holding part.

This specific rotatable coupling ensures functionally advantageous, rotatable attachment of the shower holding part to the rod holding part in a structurally simple manner. The manufacturing outlay for the coupling piece on the rod holding part and for the wrap spring unit can be kept low, and, by virtue of the wrap spring unit wrapping around the coupling piece over more than 180°, the turning resistance force, i.e. the force which the rotatable coupling opposes to a rotation of the shower holding part on the rod holding part by means of the wrap spring unit can be provided in a desired manner or magnitude.

In a manner similar to that mentioned above in relation to the wrap spring unit for the clamping unit, there are once again many readily available degrees of freedom for the setting of a magnitude or intensity of the turning resistance force desired in the respective application. As already mentioned, this relates inter alia to the cross-sectional thickness and cross-sectional shape of a spring wire material used for the wrap spring unit, to the winding diameter and the number of turns of the wrap spring unit wrapping around the coupling piece, wherein, here too, the wrap spring unit can comprise a single wrap spring or a plurality of wrap springs, in this case preferably disposed adjacent to each other in a longitudinal axis direction of the coupling piece, depending on requirements, wherein, in the latter case, each wrap spring can wrap around the coupling piece by more than 180° or, alternatively, one or more or all the wrap springs can wrap around the coupling piece by no more than 180° in such a way that the wrap spring unit formed by the plurality of wrap springs wraps around the coupling piece over more than 180° in total.

Depending on the application, it is possible, by appropriate embodiment of the wrap spring unit, to implement the rotatable coupling in such a way that it permits rotation of the shower holding part relative to the rod holding part only in the first rotational direction or, alternatively, also in the opposite, second rotational direction, wherein, in the latter case, once again depending on requirements, the wrap spring unit can be embodied in such a way that an approximately equal turning resistance force is obtained for both directions of rotation or, alternatively, a higher turning resistance force is obtained for one rotational direction than for the other rotational direction. In particular, this also includes the frequently desired application where the shower holding part can be rotated relatively easily in one direction but, in contrast, can be rotated only with greater difficulty in the other direction, i.e. the turning resistance force or, to use a synonym, the torsional moment provided in this case by the wrap spring unit is of significantly different magnitude or intensity in the two directions of rotation.

In an illustrative embodiment, the wrap spring unit is formed by a wrap spring which wraps around the coupling piece over more than 360° between a first and a second spring end and is coupled to the shower holding part for conjoint rotation in both directions of rotation at only one of its two ends or, alternatively, is coupled to the shower holding part for conjoint rotation in only the first rotational direction at one end and only in the second rotational direction at the other end. These represent advantageous implementations, adapted to the respective requirements, of the coupling of the wrap spring unit to the shower holding part.

In the illustrative embodiment in which one spring end is coupled for conjoint rotation to the shower holding part in both directions of rotation, the other spring part is preferably free and the wrap spring is taken along with a certain contraction when the shower holding part is rotated in one direction and is taken along with a certain enlargement when said part is rotated in the other direction. Depending on the embodiment of the wrapping of the wrap spring around the coupling piece, the wrap spring rotates as a whole with the shower holding part, wherein it generally provides a higher turning resistance force in the contracting rotational direction than in the enlarging rotational direction, this being desired in many cases, as mentioned above. As an alternative, the embodiment can be chosen in such a way that the wrap spring locks in the contracting direction, whether because it is fixed by its other spring end to the rod holding part or whether it locks due to frictional engagement with the coupling piece, even though its other spring end is free.

If the wrap spring is coupled to the shower holding part at both ends in one and the other rotational direction, it can be taken along symmetrically with the shower holding part in both directions of rotation, e.g. with a slight enlargement in both cases, thereby making it possible to implement a variant with a torsional moment of equal magnitude, i.e. a turning resistance force of equal magnitude, in both directions of rotation when required.

In an illustrative embodiment, the rod holding part includes a rod passage opening and the wrap spring unit for the rotational coupling of the shower holding part and the rod holding part is arranged with a spring longitudinal axis extending perpendicular to a longitudinal axis direction of the rod passage opening. This allows a structural design of the holder which is advantageous in many cases.

In an illustrative embodiment, the aspects of the specific rotational coupling between the shower holding part and the rod holding part and the specific clamping unit for the releasable clamping of the holding body on the rod are combined. In corresponding fashion, the functional and design characteristics and advantages mentioned above in relation to these aspects are combined in this holder according to the illustrative embodiment. This combined holder too can be of relatively compact construction. It can be clamped reliably on a rod and shifted along the rod by user-operated release of the clamping. The shower holding part, optionally with the hand-held shower body held thereon, can be rotated easily relative to the rod holding part by means of which the holder is held clamped on the rod.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous embodiments of the invention are illustrated in the drawings. These and further embodiments of the invention are described in greater detail below. In the drawings.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

The rod-mountable holder illustrated in FIGS. 1 to 10 and 14 includes a holding body 1, which is configured for displaceable attachment to a rod and has a rod passage opening 2 for the rod. In this case, the holder is shown in a condition mounted on a rod 3, which can be a hand-held shower rod, for example, that is to say a rod intended for mounting a sanitary hand-held shower. Moreover, the holder includes a clamping unit 4 movable between a clamp position and an enable position, which clamping unit, in case of the holding body 1 attached to the rod 3, in the enable position enables a shifting movement of the holding body 1 along the rod 3 and in the clamp position exerts a clamping force, which blocks a shifting movement of the holding body 1 along the rod 3. For user-operated movement of the clamping unit 4 between its clamp position and its enable position, the holder has an operating unit 5.

The clamping unit 4 is formed by a wrap spring unit 6 wrapping around the rod passage opening 2. In the embodiment shown in FIGS. 1 to 6 and 14, the wrap spring unit 6 includes a wrap spring 7 wrapping around the rod passage opening 2 over more than 360°, wherein the wrap spring 7 is movable by the operating unit 5 between a constricting condition providing the clamp position of the clamping unit 4 and an enlarging condition providing the enable position of the clamping unit 4.

Consequently, the wrap spring 7 wraps around the rod passage opening 2 over more than one complete winding or turn, thereby enabling the clamping force to act along the entire circumference of the rod passage opening 2 and hence along the entire circumference of the rod 3 passed through. As an option, the wrap spring 7 wraps around the rod passage opening 2 over more than 720°, i.e. over more than two windings/turns. In the examples shown in FIGS. 1 to 6 and 14, it wraps around the rod passage opening 2 over more than two and somewhat less than three full turns/windings. With a larger wrap angle or a larger number of windings/turns of the wrap spring 7 around the rod passage opening 2, it is possible when required to increase the effective contact area for the clamping force or to use a weaker spring material for the wrap spring 7 to achieve the same required clamping force.

The wrap spring ends with two ends 7a, 7b, which are situated on the same side in relation to the rod passage opening 2 in corresponding embodiments, as in the example shown, on the left-hand side of the rod passage opening 2 in FIGS. 1 to 4.

In corresponding embodiments, as in the examples shown in FIGS. 1 to 10 and 14, the constricting condition of the wrap spring unit 6 or wrap spring 7 is an initial condition of said spring, to which the wrap spring 7 returns from the enlarging condition automatically by inherent elasticity.

In corresponding embodiments, the operating unit 5, as in the examples shown in FIGS. 1 to 9 and 14, is a push button operating unit, or push button unit 8 for short, having a push button 8a which acts on the wrap spring unit 6. In alternative embodiments, the operating unit 5, as in the example shown in FIG. 10, is a rotary knob operating unit, or rotary knob unit 9 for short, having a rotary knob 9a which acts on the wrap spring unit 6.

In corresponding embodiments, as in the example shown, the push button 8a in the case of this push button variant is mounted to be movable with a radial main directional component Tk in relation to the wrap spring 7. More specifically, it is possible when required, as in the example shown, for the transverse movement of the push button 8a to be parallel to the radial direction of the wrap spring 7, which, for its part, is perpendicular to the longitudinal central axis of the wrap spring 7, which is in the form of a helical spring.

In the embodiment shown in FIGS. 1 to 9, a push button slotted guide mechanism 10 as a coupling means between the push button unit 8 and the wrap spring unit 6 converts the transverse movement of the push button 8a into a spreading movement of the ends 7a, 7b of the wrap spring 7, wherein the spreading movement of the wrap spring ends 7a, 7b takes place with a tangential main directional component in relation to the wrap spring 7. Here, the tangential direction is perpendicular to the radial direction and to the longitudinal central axis of the wrap spring 7. For this purpose, the push button slotted guide mechanism 10 can, for example, comprise a slotted guide track with an oblique surface on the push button 8a, along which the wrap spring ends 7a, 7b slide.

As an option, the push button unit 8 furthermore includes a return spring 11 in order to bring about or assist the return of the push button 8a into the initial position thereof. In the example shown, the push button 8a is pushed in the direction into the holding body 1 by the user, whereby it spreads the wrap spring 7 by means of the push button slotted guide mechanism 10 and, as a result, said spring is moved from its constricting condition, in which it clamps the holding body 1 on the rod 3, into its enlarging condition, in which it enables the shifting movement of the holding body 1 along the rod 3. When released, the push button 8a returns to the initial position under the action of the return spring 11 and possibly of an assisting effect of the wrap spring 7, which is prestressed by its inherent elasticity into its constricting initial condition, with the result that the wrap spring 7 can once again assume its constricting clamp position.

In the rotary knob variant shown in FIG. 10, the rotary knob 9a is mounted to be movable in rotation about a rotational axis DA, which has a radial main directional component Dk in relation to the wrap spring 7. The direction of the rotational axis DA is preferably parallel to the radial direction of the wrap spring 7. In the rotary knob variant, the direction of the rotational axis DA can be parallel to the transverse direction of movement of the push button 8a of the push button variant, for example. A rotary knob slotted guide mechanism converts the rotary movement of the rotary knob 9a into a spreading movement of the wrap spring ends 7a, 7b, by means of which said ends spread apart with a main directional component which is tangential in relation to the wrap spring 7, i.e. the wrap spring spreading movement corresponds to the spreading movement of the wrap spring 7 explained above in relation to the push button variant. Any suitable implementation of the kind familiar to a person skilled in the art can be used for the rotary knob slotted guide mechanism, and this therefore does not have to be shown and explained further here. For example, the rotary knob 9a can have a slotted guide track with an oblique surface extending in the circumferential direction, along which the wrap spring ends 7a, 7b slide.

In the above mentioned embodiments, the operating unit 5 in each case acts on both ends 7a, 7b of the wrap spring 7 in order to move said ends into the enlarging, spread-apart condition thereof. In alternative embodiments, the operating unit 5 acts only on one end of the wrap spring 7, while the other leg spring end is held stationary, e.g. on an associated fastening point of the holding body 1. In these alternative embodiments, the two leg spring ends 7a, 7b can be situated on the same side or on different sides of the rod passage opening 2.

In corresponding embodiments, as in the examples shown in FIGS. 1 to 10 and 14, the holder includes an open, elastic clamping sleeve 12 which defines the rod passage opening 2 and around which the wrap spring unit 6 or wrap spring 7 is wrapped. Since the clamping sleeve 12 is open, i.e. has a circumferential gap 12a, it can follow the constricting or enlarging movement of the wrap spring unit 6 around the rod passage opening 2 when the wrap spring unit 6 or wrap spring 7 wrapping around the clamping sleeve 12 constricts with a clamping action or enlarges, releasing the clamping. In this case, the clamping sleeve 12 transmits the clamping force of the wrap spring unit 6 to the rod 3 in the rod passage opening 2. The wrap spring unit 6 then does not need to come into direct contact with the rod 3. The clamping sleeve 12 is composed of a suitable resilient plastic or metal material and surrounds the rod 3, making direct contact therewith. In alternative embodiments, the wrap spring unit 6 wraps directly around the rod 3 with direct contact without the interposed clamping sleeve 12.

In corresponding embodiments, as shown, the holding body 1 has a cylindrical shape with a cylinder longitudinal axis perpendicular to a longitudinal axis direction Ls of the rod passage opening 2.

Figure 1:
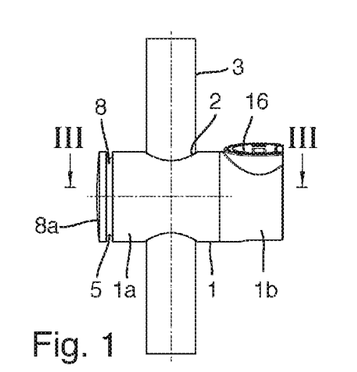
FIG. 1 shows a side view of a holder mounted displaceably on a rod and including a wrap spring unit, a push button operating unit and a push button slotted guide mechanism coupling these.
Figure 2:
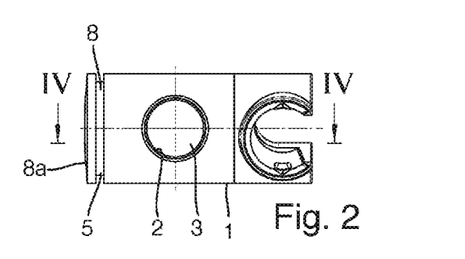
FIG. 2 shows a plan view from above of the rod-mounted holder.
Figure 3:
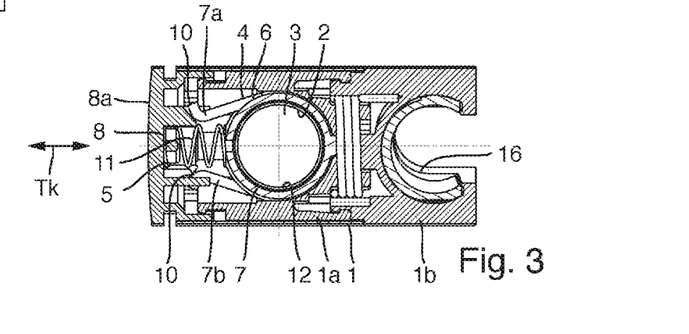
FIG. 3 shows a sectional view along a line III-III in FIG. 1.
Figure 4:
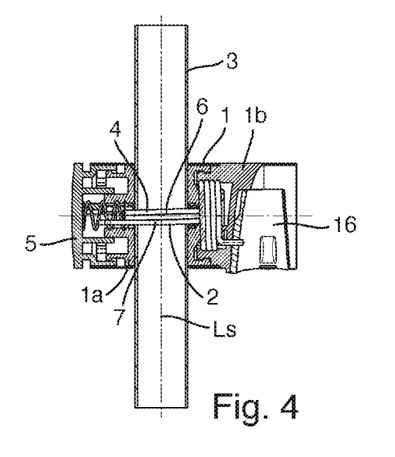
FIG. 4 shows a sectional view along a line IV-IV in FIG. 2.
Figure 5:
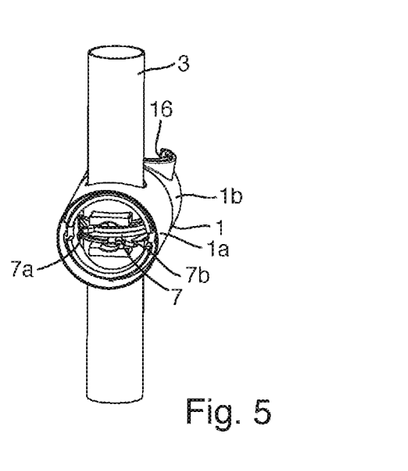
FIG. 5 shows a perspective side view of the rod-mounted holder with the push button operating unit removed.
Figure 6:
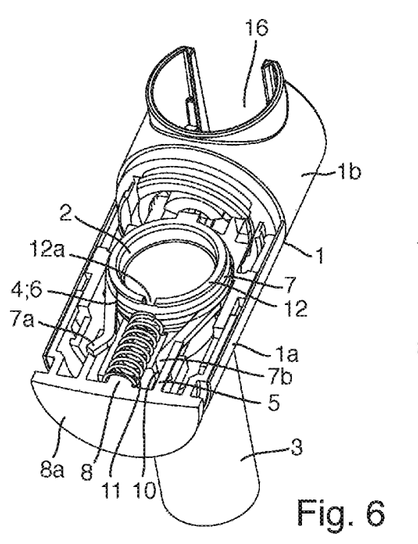
FIG. 6 shows a perspective side view from above of the rod-mounted holder in a partially cutaway illustration.
Figure 7:
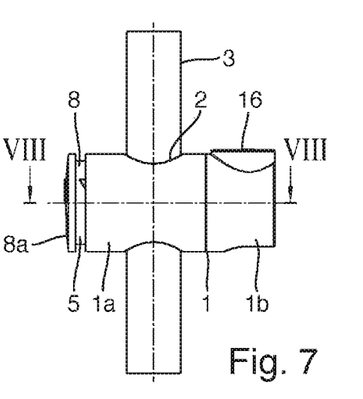
FIG. 7 shows the side view from FIG. 1 of a variant having a modified wrap spring unit.
Figure 8:
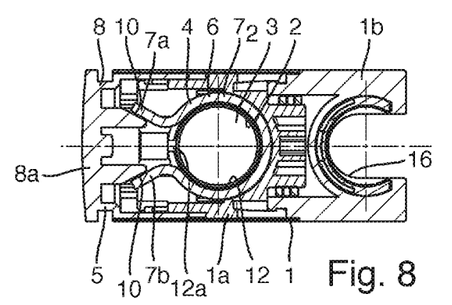
FIG. 8 shows a sectional view along a line VIII-VIII in FIG. 7.
Figure 9:
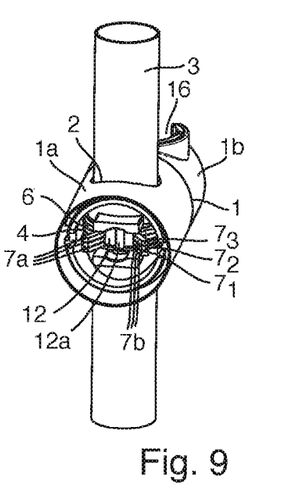
FIG. 9 shows the perspective side view from FIG. 5 of the variant in FIG. 7.
Figure 10:
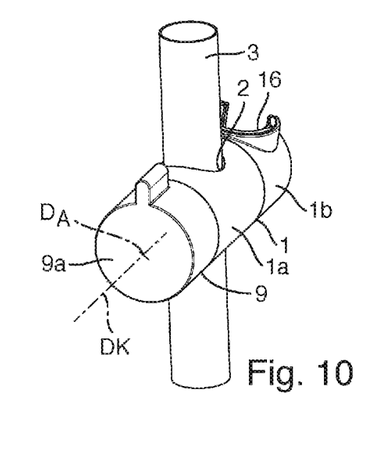
FIG. 10 shows a perspective side view from above of a variant of the holder with a rotary knob operating unit.

FIGS. 7 to 9 illustrate a rod-mountable holder which can be implemented in any one of the embodiments explained above with reference to FIGS. 1 to 6 and 14, wherein an alternative embodiment of the wrap spring unit 6 is used as the only difference. In other respects, reference can be made to the above explanations relating to the corresponding embodiments, and these apply in corresponding fashion to the variant embodiment in FIGS. 7 to 9.

More specifically, in the illustrative embodiment in FIGS. 7 to 9, the wrap spring unit 6 includes a plurality of wrap springs $7_1$, $7_2$, $7_3$ disposed adjacent to each other in a longitudinal axis direction Ls of the rod passage opening 2, each spring wrapping around the rod passage opening 2 over more than 180°, wherein the respective wrap spring $7_1$, $7_2$, $7_3$ is movable by the operating unit 5 between a constricting condition providing the clamp position of the clamping unit 4 and an enlarging condition providing the enable position of the clamping unit 4. As in the example shown, the plurality of wrap springs $7_1$, $7_2$, $7_3$ preferably rest against each other with direct contact, thereby forming a wrap spring pack. In the example shown, the wrap spring pack includes the three wrap springs $7_1$, $7_2$, $7_3$ and, in alternative embodiments, it includes two or four or more individual wrap springs. Such an implementation of the wrap spring unit 6 from a plurality of wrap springs can increase fail safety since, if one of the wrap springs breaks, the other, still intact wrap springs can perform or continue to ensure the clamping function.

In the example shown, each of the wrap springs $7_1$, $7_2$, $7_3$ wraps around the rod passage opening 2 over an angle of about 310° to 320° while, in alternative embodiments, each of said springs wraps around it over an angle of between 180° and 310° or over an angle of more than 320° in each case. It is possible, in particular, in alternative embodiments, for at least one of the wrap springs to wrap around the rod passage opening 2 over more than 360°. In the example shown, the wrap springs $7_1$, $7_2$, $7_3$ each rest with their two spring ends 7a, 7b synchronously next to one another, i.e. in the same position in the circumferential direction. In general, this simplifies the spreading of the wrap springs $7_1$, $7_2$, $7_3$ by the operating unit 5. In alternative embodiments, at least two of the wrap springs are disposed with spring ends offset relative to each other in the circumferential direction. When required, this can be used to wrap the rod passage opening 2 along the entire circumference of the opening by means of the wrap spring unit 6, for example, even if each of the wrap springs forming the wrap spring unit 6 or wrap spring pack wraps around the rod passage opening 2 only over less than 360°.

The user-operated movement of the clamping unit 4 formed by this wrap spring unit 6 by means of the plurality of individual wrap springs $7_1$, $7_2$, $7_3$ between the clamp position and the enable position thereof is accomplished by the operating unit 5 in the push button variant or the rotary knob variant in the same way as that explained above with reference to the wrap spring unit 6 formed by the wrap spring 7. By pressing the push button 8a of the push button unit 8 or rotating the rotary knob 9a of the rotary knob unit 9, the wrap springs $7_1$, $7_2$, $7_3$ are moved jointly from the constricting condition thereof into the enlarging condition thereof, wherein the constricting condition is preferably once again an initial condition of the respective wrap spring $7_1$, $7_2$, $7_3$, to which it returns from the enlarging condition automatically by inherent elasticity. By releasing the push button 8a or turning the rotary knob 9a back or further, the wrap spring pack of the wrap springs $7_1$, $7_2$, $7_3$ can in this case return to the constricting clamping condition.

Figure 11:
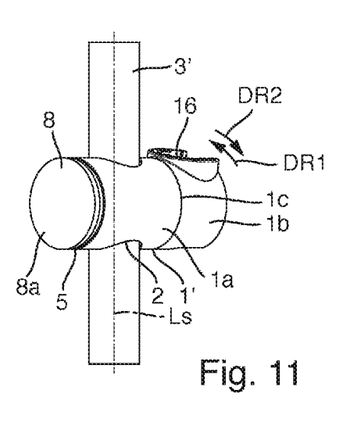
FIG. 11 shows a perspective side view of a holder mounted on a hand-held shower rod with a rod holding part and a shower holding part which can be rotated relative to the latter by means of a wrap spring rotatable coupling, for a sanitary hand-held shower.
Figure 12:
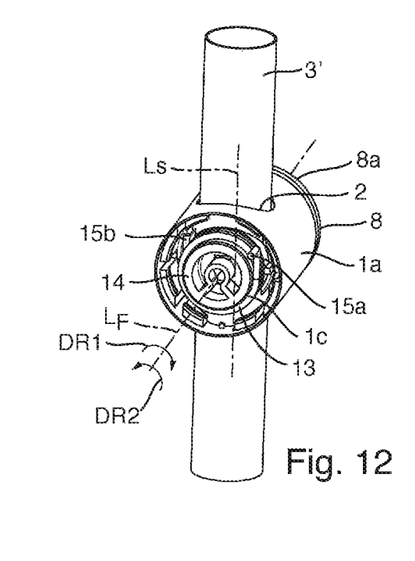
FIG. 12 shows a perspective side view of the holder in FIG. 11 with the shower holding part removed for a variant with a round-wire wrap spring unit.
Figure 13:
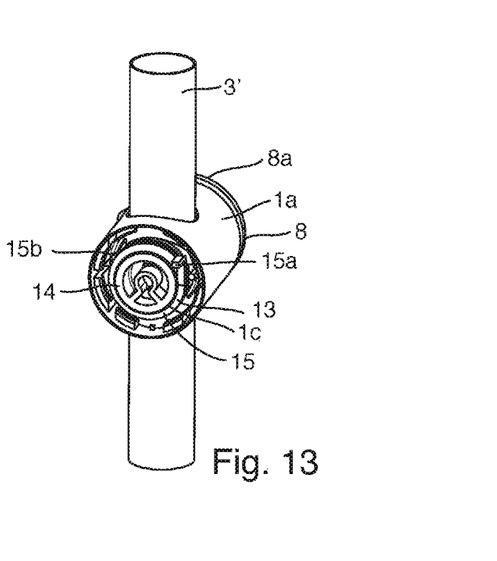
FIG. 13 shows the perspective side view from FIG. 12 of a variant having a square-wire wrap spring unit.

FIGS. 11 to 13 illustrate a rod-mountable holder for a sanitary hand-held shower, wherein the holder has a holding body 1' for attachment to a hand-held shower rod 3' and FIGS. 11 to 13 show the holder and the holding body 1' in the mounted condition on the hand-held shower rod 3'. The holding body 1' includes a rod holding part 1a that can be mounted on the hand-held shower rod 3', a shower holding part 1b for holding the hand-held shower and a rotatable coupling 1c, by means of which the shower holding part 1b is coupled to the rod holding part 1a in such a way as to be rotatable relative to the latter in a first rotational direction DR1 and/or in a second rotational direction DR2 opposite to the first. The two opposite directions of rotation DR1, DR2 can be, in particular, clockwise or anticlockwise rotations around a rotational axis, which is perpendicular to a longitudinal axis of the rod 3' when the holder 1' is mounted on the rod 3'.

With the shower holding part 1b omitted in FIGS. 12 and 13, it can be seen that the rotatable coupling 1c includes a wrap spring unit 13, which wraps around a coupling piece 14 formed on the rod holding part 1a over more than 180° while providing a turning resistance force for the rotary motion of the shower holding part 1b relative to the rod holding part 1a and is rotationally coupled to the shower holding part 1b. In other respects, the rotatable coupling 1c is embodied in a conventional manner which will therefore not need to be explained further here, such that the shower holding part 1b is held on the rod holding part 1a by said coupling in a manner which allows rotary motion. More specifically, the rotatable coupling 1c can be embodied in such a way that the rotation of the shower holding part 1b relative to the rod holding part 1a can take place in a continuously variable manner or, alternatively, with overridable latching stages, depending on requirements. The turning resistance force opposes a rotary motion exerted on the shower holding part 1b by the user with a desired resistance that can be overcome by the user and it secures the shower holding part in the respective instantaneous rotational position thereof against unwanted self-acting rotation, e.g. due to the weight of a hand-held shower held by the shower holding part.

In illustrative embodiments, as in the example shown, the wrap spring unit 13 is formed by a wrap spring 15 wrapping around the coupling piece 14 over more than 360° between a first spring end 15a and a second spring end 15b. Depending on requirements and on the application, the wrap spring 15 is coupled to the shower holding part 1b for conjoint rotation in both directions of rotation DR1, DR2 at only one of its two spring ends 15a, 15b or, alternatively, is coupled to the shower holding part 1b for conjoint rotation in only one rotational direction at the first spring end 15a and only in the other of the two opposite directions of rotation at the second spring end 15b. In the implementation shown in FIG. 12, a round wire material is used for the wrap spring 15. The variant embodiment shown in FIG. 13 differs from that in FIG. 12 in that a square wire material is used for the wrap spring 15.

In illustrative embodiments, the rod holding unit 1a includes a rod passage opening 2' and the wrap spring unit 13 is arranged with a spring longitudinal axis LF extending perpendicular to a longitudinal axis direction Ls of the rod passage opening 2'. In advantageous embodiments of the holder, the spring longitudinal axis LF of the wrap spring unit 13 coincides with the rotational axis around which the shower holding part 1b can be rotated in the first and/or the second rotational direction DR1, DR2 relative to the rod holding part 1a, or extends offset parallel thereto.

In the example shown, the wrap spring 15 is coupled to the shower holding part 1b for conjoint rotation in both directions of rotation DR1, DR2 only at the first spring end 15a, which is angled axially for this purpose, while the other, second spring end 15b thereof is free. To couple the first spring end 15a for conjoint rotation, the shower holding part 1b has a conventional socket, which is therefore not shown in detail here, into which the first spring end 15a is fitted in such a way that it is taken along in both directions of rotation DR1, DR2 by the rotary motion of the shower holding part 1b. In one of the two directions of rotation, the wrap spring 15 is therefore taken along with a certain amount of contraction while, when rotated in the opposite direction, it is taken along with a certain amount of enlargement. In the contracting rotational direction, therefore, it thus rests more tightly against the coupling piece 14 around which it is wrapped than in the enlarging rotational direction.

The movement of the wrap spring 15 in the contracting rotational direction thus generally results in a somewhat higher frictional resistance to the rotation of the wrap spring 15 around the coupling piece 14 and a somewhat higher torsional moment of the wrap spring 15 in comparison with the enlarging rotational direction, leading overall to a somewhat higher turning resistance force of the wrap spring 15 on the shower holding part 1b in comparison with rotation of the wrap spring 15 in the enlarging rotational direction. In many cases, this results in a desirable asymmetric turning resistance force, which is perceptibly greater when the shower holding part 1b is rotated in one rotational direction than when it is rotated in the other rotational direction.

Depending on requirements and on the application, the rotatable coupling 1c is embodied in such a way that the wrap spring unit 13 or wrap spring 15 does not contract or tighten with a locking action on the coupling piece 14 when it is rotated in the contracting rotational direction but rotates with the shower holding part 1b after a short contraction travel. In alternative embodiments, the wrap spring unit 13 or wrap spring 15 can lock in the contracting direction, as a result of which the shower holding unit 1b can then no longer be rotated in the contracting rotational direction.

In alternative embodiments which are not shown, the shower holding part 1b takes along the wrap spring unit 13 or wrap spring 15 in one rotational direction at one spring end and in the other rotational direction at the other spring end, for which purpose the two spring ends 15a, 15b are then in each case rotationally coupled to the shower holding part 1b in one of the two opposite directions of rotation DR1, DR2 while they are free in the other rotational direction. This can be achieved, for example, by means of corresponding stops on the shower holding part 1b, which strike against the facing spring end 15a, 15b in only one of the two directions of rotation DR1, DR2 in each case and take it along in the relevant rotational direction.

The holder explained with reference to FIGS. 11 to 13, having the holding body 1', is embodied in corresponding embodiments for displaceable or, alternatively, non-displaceable attachment to the rod 3'. In the implementation with a holding body 1' that can be attached displaceably to the rod 3', the holding body 1' can be identical with the holding body 1 of the holder explained with reference to FIGS. 1 to 10 and 14. The holding body 1' then accordingly includes the clamping unit 4 in the form of the wrap spring unit 6 and the operating unit 5. In other words, the holder 1 in this case includes the rod holding part 1a, the shower holding part 1b and the rotatable coupling 1c with the associated wrap spring unit 13. In this case, the rod holding part 1a includes the rod passage opening 2, through which the rod 3 along which the holder or holding body 1 can be moved extends in the mounted state of the holder.

In other words, in this illustrative implementation of the holder according to the invention, there is combined achievement of the aspect of longitudinal displaceability of the holder or the holding body thereof along a rod and the possibility of fixing it releasably on the rod by means of the associated clamping wrap spring unit 6, and of the aspect of holding a sanitary hand-held shower on a rod by means of the holding body with a rod holding part and a shower holding part rotatable relative thereto, using the rotatable coupling having the associated wrap spring unit 13. In FIGS. 1 to 14, this optional combined implementation of the invention is represented by the fact that those components which can be implemented in an identical way or are at least functionally equivalent are indicated by the same reference signs, both for the variant embodiments shown in FIGS. 1 to 10 and 14 and the variant embodiments shown in FIGS. 11 to 13.

In corresponding embodiments of this combinatory variant, the operating unit 5 is, as shown, arranged on the rod holding part 1a while, in alternative embodiments, it is arranged on the shower holding part 1b. More specifically, as shown, the operating unit 5 and the shower holding part 1b in corresponding embodiments are arranged on opposite sides of the holding body 1, 1' in relation to the rod passage opening 2, which optimizes the convenience of operation for the user and favours a compact construction of the holding body 1, 1', e.g. in a cylindrical design, in many applications.

To hold the hand-held shower, the shower holding part 1b has a suitable hand-held shower holding means, which, in corresponding embodiments, can be a conventional cone-shaped hand-held shower socket 16, as in the example shown. The hand-held shower or, more specifically, a hand-held shower body, e.g. one having a handle body section or a connecting section for a water-supplying hand-held shower hose, can be inserted into this hand-held shower socket 16 from the wider end of the cone. As an alternative, that section of the hand-held shower which interacts with the cone-shaped hand-held shower socket 16 can also be formed by a correspondingly cone-shaped connecting section of a hand-held shower hose, to which a hand-held shower body is connected.

Figure 14:
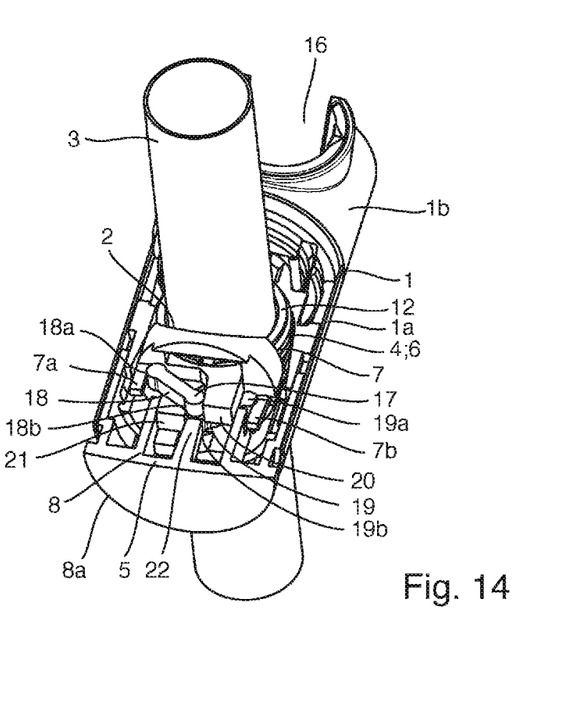
FIG. 14 shows the view from FIG. 6 of a variant having a toggle lever coupling of the push button operating unit and the wrap spring unit.

FIG. 14 illustrates a variant of the holder in FIGS. 1 to 9 which differs from the latter in the coupling of the operating unit 5 to the wrap spring unit 6. Instead of the rotary knob slotted guide mechanism 10, the operating unit 5 in the variant shown in FIG. 14 acts via a toggle lever coupling 17 on the spring ends 7a, 7b of the wrap spring 7 in order to spread the wrap spring 7 apart in the desired manner by means of the pressing movement of the push button 8a. For this purpose, the toggle lever coupling 17 includes, for each of the two spring ends 7a, 7b, a respective toggle lever arm 18, 19, each of which rests by means of an end region 18a, 19a against the associated spring end 7a, 7b, while it is supported by means of its other end 18b, 19b on a respective associated supporting section 20, 21 of the holding body 1. In this case, the two toggle lever arms 18, 19 are fixed rotatably to one another at their second ends 18b, 19b to form an associated toggle lever joint.

A pressure web 22 formed on an inner side of the push button 8a presses against the toggle joint, i.e. against the two second ends 18b, 19b of the two toggle lever arms 18, 19 when the push button 8a is pushed in the direction into the holding body 1 by the user, as a result of which the rotationally coupled second ends 18b, 19b of the toggle lever arms 18, 19, which are arranged with the longitudinal axes oblique to the transverse actuating direction of the push button 8a, accompany this transverse movement, with the result that the toggle lever arms 18, 19 undergo an opposing rotation, by means of which the wrap spring 7 is spread apart at its ends 7a, 7b, as desired.

After the push button 8a is released by the user, the push button 8a is moved back in the direction out of the holding body 1, which is cylindrical for example, wherein this return movement is once again accomplished automatically under the action of a return spring (not shown here) and/or under the action of the wrap spring 7, which is prestressed in the direction of the unspread condition of its spring ends 7a, 7b.

As already mentioned briefly above, the holder shown in FIG. 14 can also be embodied in such a way that it is identical with the holder shown in FIGS. 11 to 13 or additionally has the features thereof. Conversely, the holder in FIGS. 11 to 13 can additionally have the features of the holder in FIG. 14.

As the illustrative embodiments shown and those explained above make clear, the invention makes available a rod-mountable holder which can be mounted displaceably and in a releasably clampable manner on a rod in a very advantageous way and/or is suitable for attaching a sanitary hand-held shower to a hand-held shower rod.

Although the invention has been described in detailed with reference to preferred embodiments, variations and modifications exist within the spirit and scope of the invention as described and defined in the following claims.

The invention claimed is:

1. A rod-mountable holder, comprising:
   a holding body configured for displaceable attachment to a rod and including a rod passage opening for the rod;
   a clamping unit movable between a clamp position and an enable position, the clamping unit, in case of the holding body attached to the rod, in the enable position is capable of enabling a shifting movement of the holding body along the rod and in the clamp position is capable of exerting a clamping force to block a shifting movement of the holding body along the rod; and an operating unit for user-operated moving of the clamping unit between the clamp position and the enable position;
wherein the clamping unit is a rod passage wrap spring unit wrapping around the rod passage opening, the rod passage wrap spring unit comprising at least one of the following:
a plurality of first rod passage wrap springs disposed adjacent to each other in a longitudinal axis direction of the rod passage opening, each first rod passage wrap spring wrapping around the rod passage opening over more than 180°, or
a second rod passage wrap spring wrapping around the rod passage opening over more than 360°,
wherein each of the first rod passage wrap springs or the second rod passage wrap spring is movable by the operating unit between a constricting condition providing the clamp position of the clamping unit and an enlarging condition providing the enable position of the clamping unit, and
wherein the two ends of each of the first rod passage wrap springs or the second rod passage wrap spring are located on a same side in relation to the rod passage opening.

2. The rod-mountable holder according to claim 1, configured to be mounted on a rod of a hand-held shower.

3. A rod-mountable holder, comprising:
a holding body configured for displaceable attachment to a rod and including a rod passage opening for the rod;
a clamping unit movable between a clamp position and an enable position, the clamping unit, in case of the holding body attached to the rod, in the enable position is capable of enabling a shifting movement of the holding body along the rod and in the clamp position is capable of exerting a clamping force to block a shifting movement of the holding body along the rod; and
an operating unit for user-operated moving of the clamping unit between the clamp position and the enable position;
wherein the clamping unit is a rod passage wrap spring unit wrapping around the rod passage opening, the rod passage wrap spring unit comprising at least one of the following:
a plurality of first rod passage wrap springs disposed adjacent to each other in a longitudinal axis direction of the rod passage opening, each first rod passage wrap spring wrapping around the rod passage opening over more than 180°, or
a second rod passage wrap spring wrapping around the rod passage opening over more than 360°, and
wherein each of the first rod passage wrap springs or the second rod passage wrap spring is movable by the operating unit between a constricting condition providing the clamp position of the clamping unit and an enlarging condition providing the enable position of the clamping unit;
wherein the operating unit is a push button unit including a push button acting on the rod passage wrap spring unit or is a rotary knob unit including a rotary knob acting on the rod passage wrap spring unit;
wherein:
the push button is arranged to be movable with a radial main directional movement component in relation to a radial direction of each of the first rod passage wrap springs or the second rod passage wrap spring and a push button toggle lever coupling or a push button slotted guide mechanism is provided for translating the movement of the push button to a spreading movement of the ends of each of the first rod passage wrap springs or the second rod passage wrap spring, said spreading movement having a tangential main directional movement component in relation to each of the first rod passage wrap springs or the second rod passage wrap spring, or
the rotary knob is mounted to be movable with a radial main directional component in relation to each of the first rod passage wrap springs or the second rod passage wrap spring about a rotational axis and a rotary knob slotted guide mechanism is provided for translating the rotational movement of the rotary knob to a spreading movement of the ends of each of the first rod passage wrap springs or the second rod passage wrap spring, said spreading movement having a tangential main directional movement component in relation to each of the first rod passage wrap springs or the second rod passage wrap spring.

4. The rod-mountable holder according to claim 3, wherein the plurality of first rod passage wrap springs, disposed adjacent to each other in the longitudinal axis direction of the rod passage opening, rest against each other with direct contact, thereby forming a wrap spring pack.

5. The rod-mountable holder according to claim 3, wherein the second rod passage wrap spring wrapping around the rod passage opening over more than 360° wraps around the rod passage opening over more than 720°.

6. The rod-mountable holder according to claim 3, wherein the constricting condition is an initial condition of each of the first rod passage wrap springs or the second rod passage wrap spring, and each of the first rod passage wrap springs or the second rod passage wrap spring returns to said initial condition from the enlarging condition automatically by inherent elasticity.

7. The rod-mountable holder according to claim 3, further comprising an open, elastic clamping sleeve which defines the rod passage opening, wherein the rod passage wrap spring unit is wrapped around the sleeve.

8. The rod-mountable holder according to claim 3, configured to be mounted on a rod of a hand-held shower.

9. A rod-mountable holder comprising
a holding body configured for attachment to a hand-held shower rod;
wherein the holding body comprises a rod holding part mountable to the hand-held shower rod, a shower holding part for holding a hand-held shower, and a rotatable coupling for coupling the shower holding part to the rod holding part to be turnable relative to the rod holding part in at least one of a first rotational direction or a second rotational direction opposite to the first rotational direction; and
wherein the rotatable coupling comprises a coupling piece wrap spring unit wrapping around a coupling piece disposed on the rod holding part over more than 180°, thereby providing a turning resistance force, and coupled to the shower holding part for conjoint rotation.

10. The rod-mountable holder according to claim 9, wherein:
the coupling piece wrap spring unit is a coupling piece wrap spring wrapping around the coupling piece over more than 360° between a first and a second spring end, and
the coupling piece wrap spring is coupled to the shower holding part on only one of the first and second spring ends for conjoint rotation in both rotational directions, or is coupled to the shower holding part on the first spring end only in the first rotational direction and on the second spring end only in the second rotational direction.

11. The rod-mountable holder according to claim 9, wherein the rod holding part includes a rod passage opening and the coupling piece wrap spring unit is arranged with a spring longitudinal axis extending perpendicular to a longitudinal axis direction of the rod passage opening.

12. The rod-mountable holder according to claim 9, further comprising:
- a clamping unit movable between a clamp position and an enable position, which clamping unit, in case of the holding body attached to the rod, in the enable position is capable of enabling a shifting movement of the holding body along the rod and in the clamp position is capable of exerting a clamping force to block a shifting movement of the holding body along the rod, the holding body including a rod passage opening for the rod; and
- an operating unit for user-operated moving of the clamping unit between the clamp position and the enable position thereof;
- wherein the clamping unit is a rod passage wrap spring unit wrapping around the rod passage opening and comprising at least one of the following:
- a plurality of first rod passage wrap springs disposed adjacent to each other in a longitudinal axis direction of the rod passage opening, each first rod passage wrap spring wrapping around the rod passage opening over more than 180°, and
- a second rod passage wrap spring wrapping around the rod passage opening over more than 360°, and
- wherein each of the first rod passage wrap springs or the second rod passage wrap spring is movable by the operating unit between a constricting condition providing the clamp position of the clamping unit and an enlarging condition providing the enable position of the clamping unit.

13. The rod-mountable holder according to claim 12, wherein the plurality of first rod passage wrap springs, disposed adjacent to each other in the longitudinal axis direction of the rod passage opening, rest against each other with direct contact, thereby forming a wrap spring pack.

14. The rod-mountable holder according to claim 12, wherein the second rod passage wrap spring wrapping around the rod passage opening over more than 360° wraps around the rod passage opening over more than 720°.

15. The rod-mountable holder according to claim 12, wherein opposing ends of each of the first rod passage wrap springs or the second rod passage wrap spring are located on a same side in relation to the rod passage opening.

16. The rod-mountable holder according to claim 12, wherein the constricting condition is an initial condition of each of the first rod passage wrap springs or the second rod passage wrap spring, and each of the first rod passage wrap springs or the second rod passage wrap spring returns to said initial condition from the enlarging condition automatically by inherent elasticity.

17. The rod-mountable holder according to claim 12, wherein the operating unit is a push button unit including a push button acting on the rod passage wrap spring unit or is a rotary knob unit including a rotary knob acting on the rod passage wrap spring unit.

18. The rod-mountable holder according to claim 17, wherein:
- the push button is arranged to be movable with a radial main directional movement component in relation to a radial direction of each of the first rod passage wrap springs or the second rod passage wrap spring and a push button toggle lever coupling or a push button slotted guide mechanism is provided for translating the movement of the push button to a spreading movement of the ends of each of the first rod passage wrap springs or the second rod passage wrap spring with a tangential main directional component in relation to each of the first rod passage wrap springs or the second rod passage wrap spring; or
- the rotary knob is mounted to be movable with a radial main directional component in relation to each of the first rod passage wrap springs or the second rod passage wrap spring about a rotational axis and a rotary knob slotted guide mechanism is provided for translating the rotational movement of the rotary knob to a spreading movement of the ends of each of the first rod passage wrap springs or the second rod passage wrap spring with a tangential main directional component in relation to each of the first rod passage wrap springs or the second rod passage wrap spring.

19. The rod-mountable holder according to claim 12, further comprising an open, elastic clamping sleeve which defines the rod passage opening, wherein the rod passage wrap spring unit is wrapped around the sleeve.

20. The rod-mountable holder according to claim 9, configured to be mounted on a rod of a hand-held shower.

* * * * *